United States Patent [19]

Fujimori et al.

[11] 4,395,905
[45] Aug. 2, 1983

[54] SENSOR TROUBLE DETECTING METHOD AND APPARATUS

[75] Inventors: Kyoichi Fujimori, Higashimatsuyama; Hidekazu Oshizawa, Kumagaya, both of Japan

[73] Assignee: Diesel Kiki Co., Ltd., Tokyo, Japan

[21] Appl. No.: 312,431

[22] Filed: Oct. 16, 1981

[30] Foreign Application Priority Data

Oct. 27, 1980 [JP] Japan ................................ 55/149467

[51] Int. Cl.³ .......................................... G01M 15/00
[52] U.S. Cl. .................................. 73/119 A; 123/479
[58] Field of Search .................. 73/119 A, 116, 117.3, 73/1 R, 5; 340/514; 375/10; 123/479

[56] References Cited

U.S. PATENT DOCUMENTS 3,919,885 11/1975 Kaireit .............................. 73/119 A
4,119,070 10/1978 Asano ........................... 73/119 A X
4,310,889 1/1982 Imai et al. ....................... 123/479 X Primary Examiner—Jerry W. Myracle
Attorney, Agent, or Firm—James Creighton Wray

[57] ABSTRACT

In a method for detecting the occurrence of a fault in a first sensor for producing first pulses of a repetitive time period related to a first condition to be detected or the occurrence of fault in a second sensor for producing second pulses indicative of a second condition to be detected at a ratio of one pulse to the production of N first pulses, the first pulses and the second pulses are used for monitoring each other and the detection of the occurrence of trouble in these sensors can be carried out with high reliability.

9 Claims, 9 Drawing Figures

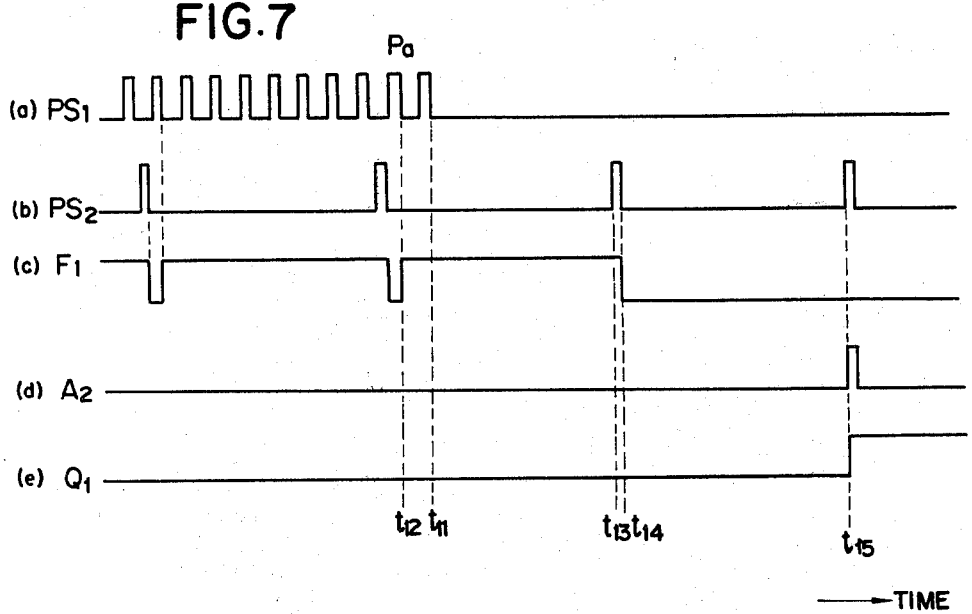
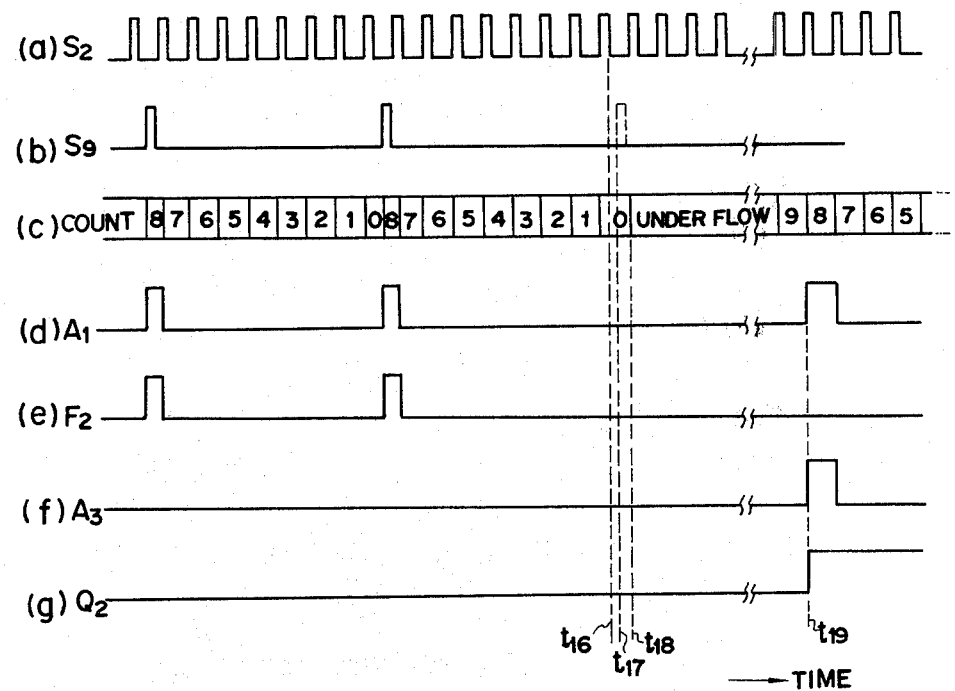

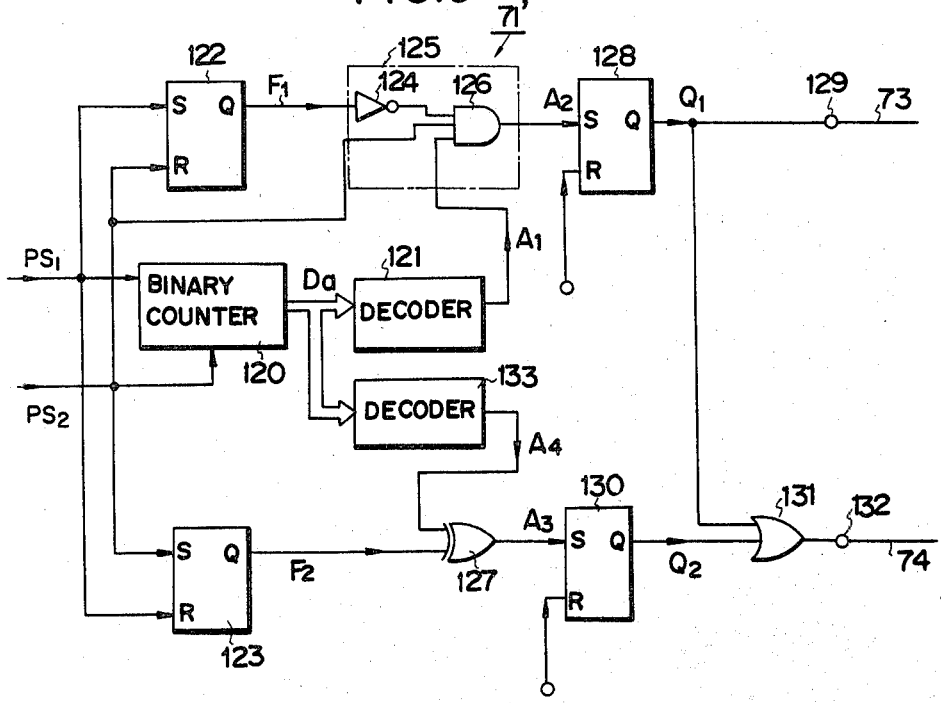

SENSOR TROUBLE DETECTING METHOD AND APPARATUS

The present invention relates to a method and apparatus for detecting a fault or trouble in a sensor, and more particularly to a method and apparatus for detecting the occurrence of a fault or trouble in a sensor for use in internal combustion engine systems.

In for example, an electronically controlled type internal combustion engine system, there are provided sensors for electrically detecting parameter values indicating conditions of operation of the internal combustion engine system, in order to optimize the control amounts, such as the amount of fuel injection, and the timing of fuel injection, in response to the condition of the engine operation from moment to moment. As an example, an electronically controlled diesel engine system will now be described. In such a system, there are provided a speed sensor for detecting the engine speed, a needle valve lift sensor for detecting the timing of fuel injection, a coolant temperature sensor for detecting the temperature of coolant, a load sensor for detecting the magnitude of load and so on, and the required amounts are provided by an electronic control system in accordance with the signals from these sensors. Therefore, the engine system cannot be operated at an optimum condition when trouble occurs in these sensors, and more particularly the engine system will be rendered inoperative when the trouble occurs in the speed sensor. To eliminate such a disadvantage, the conventional system is arranged so as to be changed from the main sensor to a stand-by sensor in response to the detection of trouble in the main sensor. However, since the conventional device for detecting the occurrence of the trouble in the sensors is arranged so as to detect that the sensor has ceased to output a signal for a predetermined time period and then to discriminate whether or not any trouble has occurred in the sensor on the basis of the detecting result, a period of time of two or three seconds is required for detecting the occurrence of the trouble in the sensor. Therefore, especially when the amount of fuel injection is large because the engine is operating at high speed, there is the disadvantage that the engine is liable to go too fast before the detection of the trouble in the sensor. Furthermore, in order to assure that the engine operates in a stable condition, it is also desired that the occurrence of the trouble in other sensor is quickly detected.

It is, therefore, an object of the present invention to provide a trouble detecting method and apparatus which can detect quickly and with high reliability the occurrence of trouble in sensors.

It is another object of the present invention to provide a trouble detecting method and apparatus which are suitable for detecting the occurrence of the trouble in the sensors for use in a electronically controlled type internal combustion engine system.

According to the present invention, in a method for detecting the occurrence of a fault in a first sensor for producing first pulses of a repetitive time period related to a first condition to be detected or the occurrence of fault in a second sensor for producing second pulses indicative of a second condition to be detected at a ratio of one pulse to the production of N first pulses, the second pulses are applied as pulses for presetting a counter to which the first pulses are supplied as counting pulses to control the value of the output from said counter to within a predetermined range. Under this condition, the occurrence of a fault in the first sensor can be detected by monitoring whether or not the value of the output from the counter varies between periods starting with the time of occurrence of one of said second pulses and ending with the time of occurrence of the next second pulse, and the occurrence of a fault in the second sensor can be detected by monitoring whether or not the value of the output from the counter reaches a predetermined value outside of said predetermined range.

Furthermore, according to the present invention, there is provided an apparatus for detecting the occurrence of a fault in a first sensor for producing first pulses of a repetitive time period related to a first condition to be detected or the occurrence of fault in a second sensor for producing second pulses indicative of a second condition to be detected at a rate of one pulse to the production of N first pulses, which apparatus comprises a first circuit for generating a first signal indicating whether or not the first pulse is generated after the occurrence of the second pulse, a second circuit for generating a second signal indicating whether or not the second pulse is generated after the occurrence of the first pulses, a counting means to which the first pulses are applied as counting pulses, the counting means being preset to a predetermined value each time a second pulse is input, and a discriminating means for discriminating faults in the first or second sensors on the basis of the count of the counting means, the state of the first signal and the state of the second signal.

Since the first pulses from the first sensor and the second pulses from the second sensor are used for monitoring each other, the detection of the occurrence of trouble in these sensors can be carried out with high reliability.

Further objects and advantages of the present invention will be apparent from the following detailed description to be read in conjunction with the accompanying drawings in which.

Figure 2:
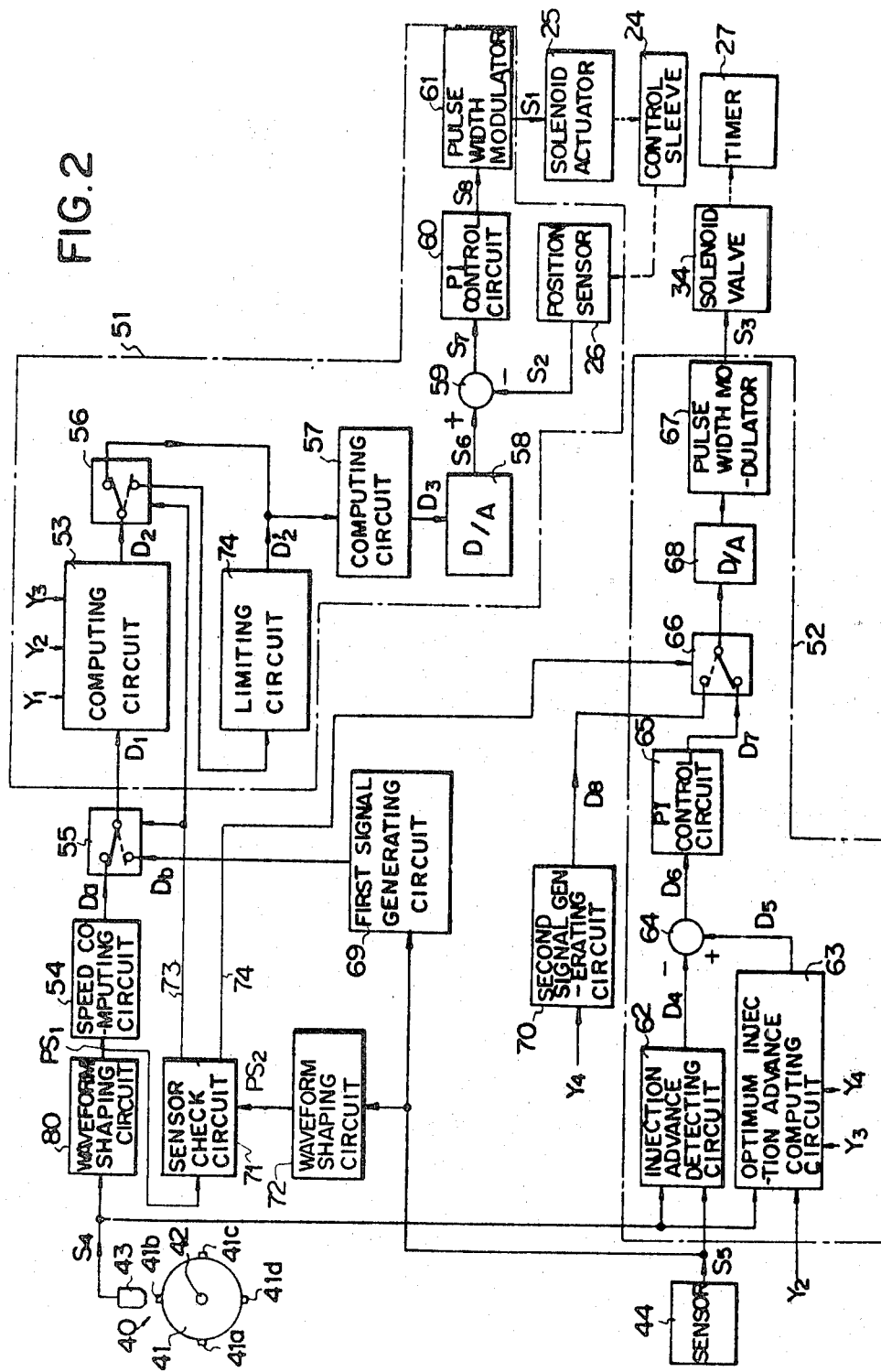
FIG. 2 illustrates a block diagram of the control system of the fuel injection apparatus shown in FIG. 1.
Figure 3:
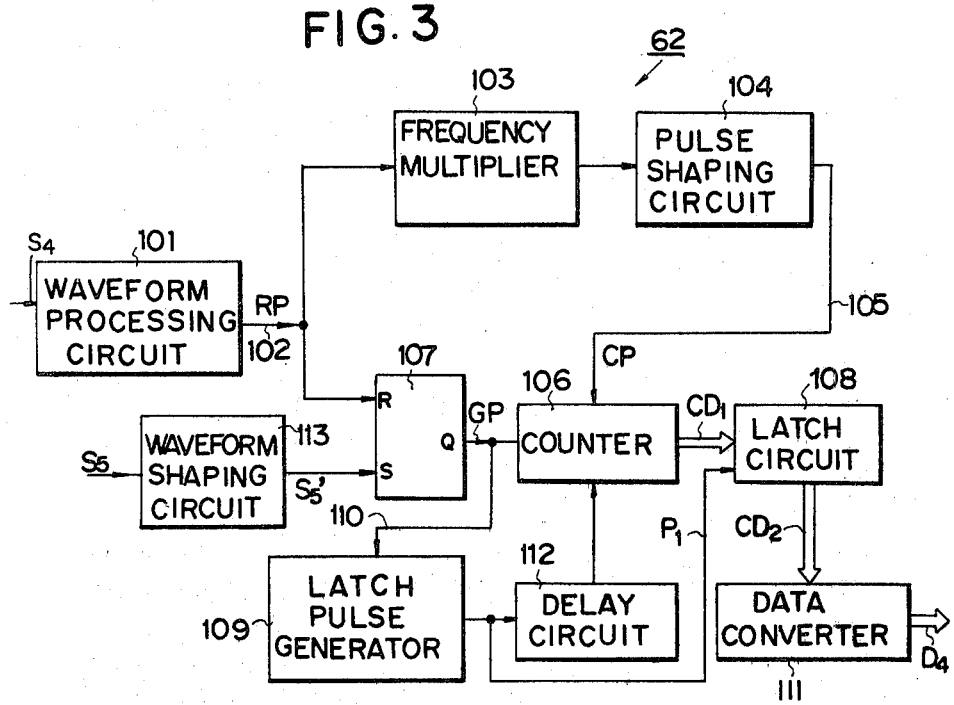
FIG. 3 illustrates a detailed block diagram of the injection advance detecting circuit of FIG. 2.
Figure 6:
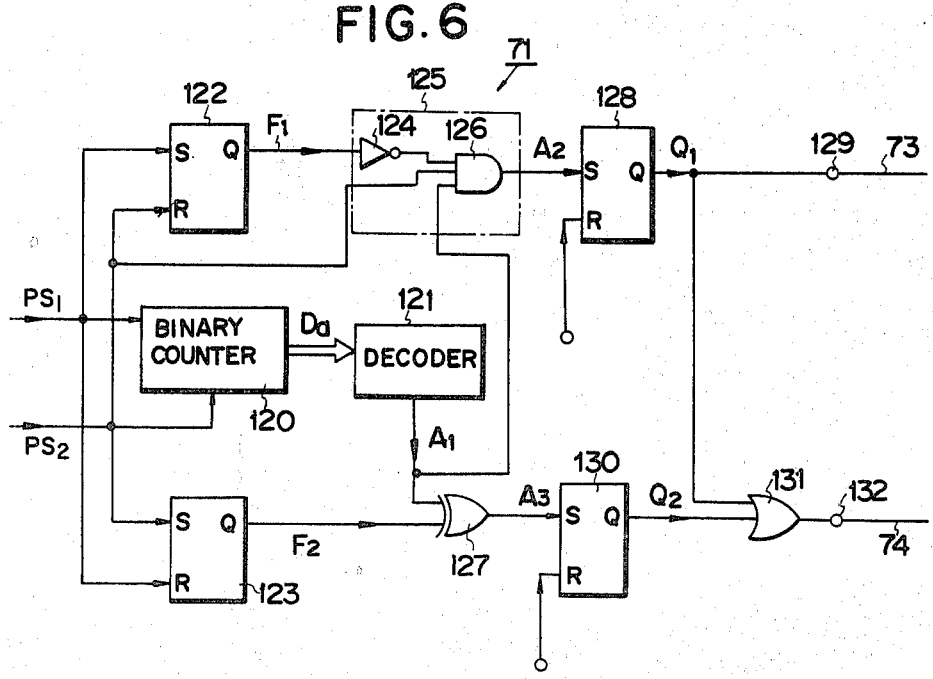

FIGS. 4(a) to 4(e) illustrate timing charts for the signals in FIG. 3;

FIGS. 5(a) to 5(c) illustrate waveforms of the signals in the circuit of FIG. 2;

FIG. 6 illustrates a detailed circuit structure of the sensor check circuit of the present invention in FIG. 2;

FIGS. 7(a) to 7(e) and FIGS. 8(a) to 8(g) are timing charts for the signals in FIG. 6; and FIG. 9 is a detailed circuit structure of another embodiment of the sensor check circuit of the present invention.

Figure 1:
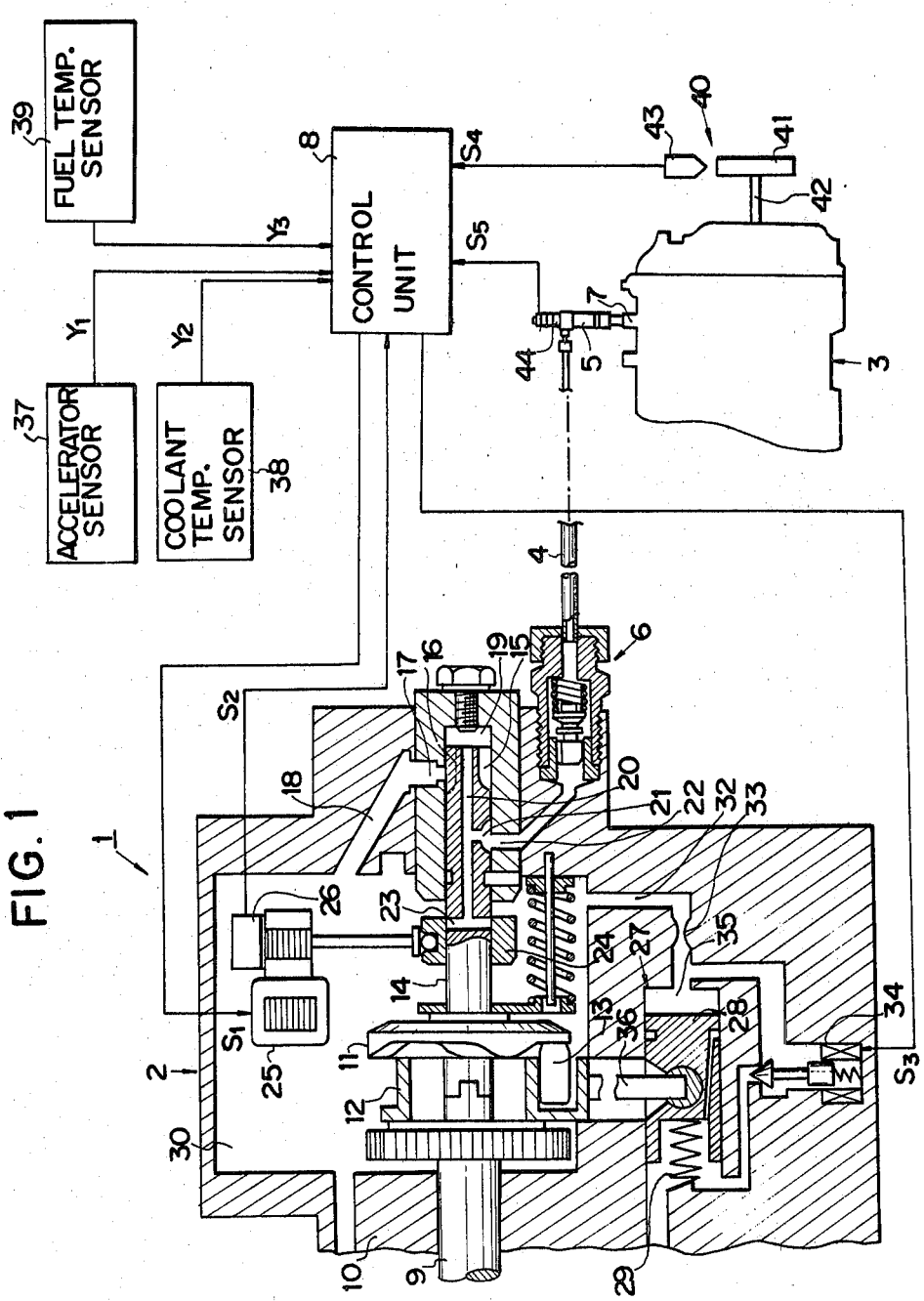
FIG. 1 is a schematic block diagram of one embodiment of the present invention including a partly sectional view of a fuel injection pump.

FIG. 1 illustrates a schematic block diagram of an electronically controlled fuel injection apparatus including a partly sectional view of a fuel injection pump, and this apparatus includes an sensor check circuit of the present invention. An electronically controlled fuel injection apparatus 1 has a distribution type fuel injection pump 2 adapted to electronically control the amount of fuel injected and the injection advance (or the timing of the beginning of fuel injection), and the fuel injection pump 2 injects the fuel from a fuel tank (not shown) into the cylinders of a diesel engine 3 through injection pipes and injection nozzles. In FIG. 1, although only one injection pipe 4 and associated injection nozzle 5 are illustrated between one delivery valve 6 of the injection pump 2 and one cylinder 7 of the engine 3, the fuel is also injected into the other cylinders of the engine 3 from associated delivery valves (not shown) of the fuel injection pump 2 in a similar manner. The electronically controlled fuel injection apparatus 1 comprises a control unit 8 for electronically controlling the amount of fuel injected from the fuel injection pump 2 and the injection advance of the fuel injected therefrom.

The fuel injection pump 2 includes a drive shaft 9 supported by a housing 10 and driven by the engine 3, a cam disc 11 rotated by the drive shaft 9, and a roller holder 12 having a plurality of rollers (only one roller 13 is seen in FIG. 1). The cam disc 11 causes a plunger 14 to reciprocate and rotate simultaneously, in accordance with the rotation of the drive shaft 9. The plunger 14 has, at one end portion thereof, intake slits provided as many as the number of cylinders of the engine 3. (Only two intake slits 15, 16 are shown in the figure.) When an intake slit comes opposite an intake port 17 during the back stroke of the plunger 14, pressurized fuel passes through a passage 18 into a high-pressure chamber 19 and a passage 20 formed in the plunger 14. Compression of the pressurized fuel introduced into the chamber 19 is begun when the intake port 17 is closed by the outside wall of the plunger 14 due to the reciprocating motion of the plunger 14. When a distributor slit 21 communicating with the passage 20 comes opposite an outlet passage 22 after further forward motion of the plunger 14, the compressed high-pressure fuel in the high pressure chamber 19 passes through the delivery valve 6 and is supplied into the combustion chamber of the engine 3 through the injection pipe 4 and the injection nozzle 5 mounted on the engine 3. When the plunger 14 is further advanced by the cam disc 11, a cut-off port 23 communicating with the passage 20 is disengaged from a control sleeve 24 to terminate the fuel injecting operation. The amount of fuel injected is adjusted by the relative position between the control sleeve 24 and the plunger 14. To permit the adjustment, the control sleeve 24 is coupled to a solenoid actuator 25. The electric power to be supplied to the solenoid actuator 25 is controlled by the control unit 8 so as to change the position of the control sleeve 24 for freely adjusting the amount of fuel injected. The control unit 8 includes a circuit for controlling the driving of the solenoid actuator 25, which is driven by a driving signal $S_1$ from the control unit 8. On the actuator 25, there is provided a position sensor 26 for detecting the position of the control sleeve 24 and a sleeve position signal $S_2$ produced from the position sensor 26 is input into the control unit 8.

The fuel injection pump 2 has an electrically controlled timer 27 for adjusting the injection advance of fuel injected from the injection pump 2. The timer 27 has a piston 28 one end face of which is urged by a compression spring 29. Although the axis of the timer 27 is shown here as being parallel with that of drive shaft 9 for convenience in explaining the apparatus, in the actual apparatus, the timer 27 is located in such a way that the axis of piston 28 and drive shaft 9 are at right angles to each other. Pressure within a housing chamber 30 is applied to the other end face of the piston 28 through a passage 32 and a constriction 33. A pressure regulating solenoid valve 34 is provided for regulating the pressure applied to piston 28 so as to locate the piston 28 at a desired position. The pressure regulating solenoid valve 34 is controlled so as to set the pressure within a cylinder chamber 35 at a desired value. Piston 28 is articulatedly connected to one end of a rod 36 whose opposite end is connected to the roller holder 12, so that the angular position of roller holder 12 may be varied according to the position of piston 28 thereby to control the injection advance of fuel by a driving signal $S_3$ supplied from the control unit 8.

To produce the driving signals $S_1$ and $S_3$ in accordance with the condition of the engine operation, there are provided an accelerator sensor 37 for generating data $Y_1$ indicative of the position of an accelerator pedal (not shown), a coolant temperature sensor 38 for generating data $Y_2$ indicative of the temperature of the coolant of the engine 3 and a fuel temperature sensor 39 for generating data $Y_3$ indicative of the temperature of the fuel. These data $Y_1$ to $Y_3$ are produced in digital form. Moreover, for detecting the engine speed and the top dead center timing of the engine 3, there is provided a sensor 40 which is composed of a gear 41 secured to a crankshaft 42 of the engine 3 and an electromagnetic pick-up coil 43. As shown in FIG. 2, four cogs $41_a$ to $41_d$ are formed on the periphery of the gear 41 and an a.c. output signal is produced as the signal $S_4$ from the electromagnetic pick-up coil 43 as these cogs approach the coil 43 and then depart from the coil 43 in sequence with the rotation of the engine 3. The signal $S_4$ changes in frequency in accordance with the engine speed. To detect the top dead center timing of the engine by the use of the sensor 40, the gear 41 is secured to the crankshaft 42 in such a way that one of the cogs faces the pick-up coil 43 each time one of the pistons of the engine 3 reaches top dead center.

The injection nozzle 5 is provided with a sensor 44 for producing a timing signal $S_5$ which indicates the timing of the opening of the valve of the injection nozzle 5. The sensor 44 is composed of an induction coil and a core which is displaced relative to the induction coil in accordance with the displacement of a needle valve in the injection nozzle 5. Since the structure of the injection nozzle having such a detector is known in the prior art, a detailed description is omitted. The timing signal $S_5$ produced by the sensor 44 is applied to the control unit 8, in which the signal $S_1$ for driving the solenoid actuator 25 and the signal $S_3$ for driving the solenoid valve 34 are generated, as described in more detail hereinafter.

FIG. 2 is a block diagram of a control system for the fuel injection apparatus shown in FIG. 1. The control system has an injection amount control section 51 and an injection timing control section 52. The injection amount control section 51 is a circuit for generating the driving signal $S_1$ for driving the actuator 25 and the control sleeve 24 is positioned in such a way that the optimum amount of fuel can be injected into the engine in accordance with the conditions of the engine operation. The injection amount control section 51 includes a computing circuit 53 for computing the optimum amount of fuel injection to which various information concerning the conditions of the engine operation is applied in the form of electric data signals. As is well known, the optimum amount of fuel injection depends upon the conditions of the engine operation at each instant, and the relationship between the optimum amount of fuel injection and the operating conditions of the engine, such as engine speed, coolant temperature, the degree of the depression of the accelerator pedal or the like, can usually be determined experimentally. In this embodiment, data $Y_1$, $Y_2$ and $Y_3$ and an engine speed data $D_1$ are applied thereto in the form of digital data, and the optimum amount of fuel injection at that time is computed in the computing circuit 53 on the basis of these input data. The computing circuit 53 includes a memory in which the data concerning the above relationship obtained in the way mentioned above is stored and the optimum amount of fuel injection can be selected in accordance with the set of input digital data mentioned above. There is known an electronic circuit which includes a memory for storing the resulting data determined by the input data in advance and which can output the stored data corresponding to the input data from the memory when the input data is applied to the electronic circuit. It is one of the prior art techniques to store the resulting data in advance at the address of the memory designated by the input data corresponding to the resulting data and to obtain the resulting data by applying the input data to the memory as address data. (For example, U.S. Pat. No. 3,689,753) Then, optimum injection amount data $D_2$ indicating the computed result in the circuit 53 is output in a digital form.

For supplying the engine speed data $D_1$ to the control section 51, there is provided a speed computing circuit 54 for computing the engine speed at each instant on the basis of a square wave pulse signal $PS_1$ which is produced in a waveform shaping circuit 80 as will be described hereinafter and a computed engine speed data $D_a$ indicating the engine speed at each instant in the digital form is produced from the speed computing circuit 54. The data $D_a$ is applied to a change-over switch 55. As will be described in more detail hereinafter, when the sensor 40 operates normally, the change-over switch 55 selects the computed engine speed data $D_a$ as the engine speed data $D_1$ and applies the data $D_a$ to the computing circuit 53. At the same time, a change-over switch 56 provided at output side of the computing circuit 53 is switched over so as to directly apply the data $D_2$ to a computing circuit 57 for computing the position of the control sleeve 24.

The circuit 57 computes the required position of the control sleeve 24 for obtaining the optimum amount of fuel injection indicated by the optimum injection amount data $D_2$. The circuit 57 can also use a ROM in a similar arrangement to the computing circuit 53. The computed result is output as sleeve position data $D_3$, and the data $D_3$ is converted into corresponding analog data by a digital-analog (D/A) converter 58. The analog data produced from the D/A converter 58 is applied as a target signal $S_6$ indicating the optimum position for the control sleeve 24 at this time to an adder 59 by which the target signal $S_6$ is added to the sleeve position signal $S_2$ from the sensor 26 with the polarity shown in FIG. 2. As a result, the adder 59 produces an error signal $S_7$ indicating the difference between the target sleeve position indicated by the target signal $S_6$ and the actual sleeve position shown by the sleeve position signal $S_2$. The error signal $S_7$ is proccessed in a PI control circuit 60 so that the signal $S_7$ is converted into a signal $S_8$ adapted to carry out an proportion-integration control operation. After this, the signal $S_8$ is applied to a pulse width modulator 61. The pulse width modulator 61 produces a pulse signal for driving, the duty ratio of which varies in accordance with the magnitude of the signal $S_8$, and the pulse signal for driving is applied as the driving signal $S_1$ to the solenoid actuator 25. The change of the position of the control sleeve 24 due to the operation of the solenoid actuator 25 is fed back to the adder 59 as a change in the sleeve position signal $S_2$, and the control sleeve 24 is positioned in such a way that the difference shown by the error signal $S_7$ becomes zero; that is, the actual sleeve position is made coincident with the target sleeve position.

On the other hand, the injection timing control section 52 is the circuit for controlling the timer 27 so as to obtain the optimum injection advance in accordance with the conditions of operation of the engine 3 and comprises an injection advance detecting circuit 62 which produces actual injection advance data $D_4$ indicative of the actual injection advance in the fuel injecting operation and an optimum injection advance computing circuit 63 for producing optimum injection advance data $D_5$ indicating the optimum injection advance at each instant on the basis of various information concerning the condition of the engine operation which are applied to the circuit 63. The signal $S_4$ from the sensor 40 is applied as a signal indicative of the top dead center timing of the engine to the circuit 62. The timing signal $S_5$ from the sensor 44 is also applied thereto. The timing signal $S_5$ is a signal indicative of the timing of the beginning of fuel injection. In the injection advance detecting circuit 62, the actual injection advance is detected on the basis of the difference between the timing $T_1$ indicated by the timing signal $S_5$ and the top dead center timing $T_2$ indicated by the signal $S_4$ and the actual injection advance data $D_4$ is produced in digital form.

In FIG. 3, a detailed block diagram of the injection advance detecting circuit 62 is illustrated. The signal $S_4$ from the sensor 40 is put into a waveform processing circuit 101 to generate a square wave signal corresponding to the signal $S_4$. The pulse train RP from the waveform processing circuit 101 is sent through an output line 102 to a frequency multiplier 103 which is a phase locked loop (PLL) circuit. As a result, the frequency of the signal output from the waveform processing circuit 101 is multiplied and the resulting multiplied signal can be derived from the frequency multiplier 103. The signal output from the frequency multiplier 103 is applied to a pulse shaping circuit 104 to shape the waveform thereof and the resulting pulse signal CP from the pulse shaping circuit 104 is applied through a line 105 to a counter 106 as count pulses.

Figure 4:
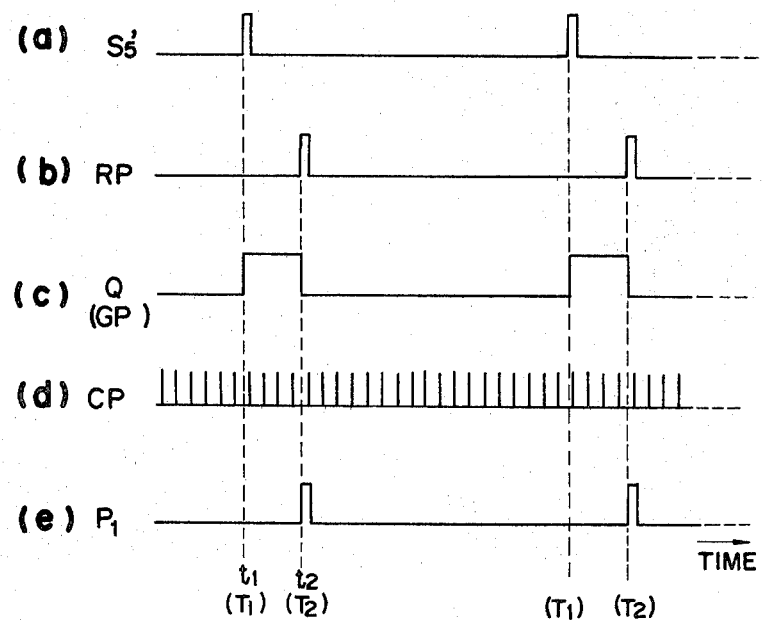

In order to count the number of count pulses produced during the period from the time the injection nozzle 5 is opened to the time the associated crank reaches top dead center, there is provided an R-S flip-flop 107 which produces count gate pulses GP from its Q output terminal for controlling the counting operation of the counter 106 on the basis of a timing signal $S_5'$ produced by shaping the signal $S_5$ in a waveform shaping circuit 113 and reference timing pulses RP produced by the waveform processing circuit 101. As described above, since the relative positional relationship between the gear 41 and the coil 43 is such that one of the cogs of the gear 41 is opposite the coil 43 each time the associated crank is at top dead center, the coil 43 produces a signal indicative of the time the crank is at top dead center and this signal is applied to the waveform processing circuit 101 to produce the reference timing pulses indicative of top dead center timing. As the timing signal $S_5'$ is applied to the SET terminal S of the R-S flip-flop 107 and the reference timing pulses from the waveform processing circuit 102 are applied to the RESET terminal R of the R-S flip-flop 107, as illustrated in FIGS. 4(a) to 4(c), the Q output of the R-S flip-flop 107 which is used as a count gate pulse GP assumes a high level for the period from the time when the timing signal $S_5'$ is produced at the time of $t_1$ (timing $T_1$) to the time when the reference timing pulses RP is produced at the time of $t_2$ (timing $T_2$). The counter 106 is arranged so as to be operative only during the high level state of the count gate pulse GP so that the number of pulses applied to the counter for the duration from $t_1$ to $t_2$ can be counted.

The count registered by the counter 106 is output as count data $CD_1$ and the count data $CD_1$ are applied to a latch circuit 108 also receiving latch pulses $P_1$, which are generated in a latch pulse generator 109 on the basis of the count gate pulses derived from the R-S flip-flop 107 through a line 110 (shown in FIG. 4(e)). Since the time when the latch pulse $P_1$ is generated is just after the counting operation of the counter 106 is inhibited by the count gate pulse GP, the resulting count data $CD_1$, which are obtained by counting the pulses produced over a time determined by each count gate pulse, is stored in the latch circuit 108 by the application of the latch pulse, and then the latched data $CD_2$ is applied to a data converter 111 while the next data from the counter 106 is being latched in the latch circuit 108. The latched data $CD_2$ is converted into angle data indicative of the injection advance at that instant in the data converter 111. The resulting data indicative of the injection advance in angle is derived as the actual injection advance data $D_4$.

The latch pulses from the latch pulse generator 109 are also applied through a delay circuit 112 to the counter 106 as reset pulses. Therefore, the counter 106 is reset by the reset pulses after every latching of the data $CD_1$ in the latch circuit 108 so that the counter 106 can be ready to carry out the next counting operation.

Returning to FIG. 2, the data $Y_2$ and $Y_3$, the signal $S_4$ and injection amount data $Y_4$ indicating the acutal amount of fuel injected in digital form are applied to the circuit 63 to compute and produce optimum injection advance data $D_5$ in the digital form on the basis of these input data and the signal. The circuit 63 can also be arranged similarly to the circuit 53. The data $D_5$ is input to an adder 64 to add the data $D_5$ to the actual injection advance data $D_4$ with the polarities shown in FIG. 2. As a result, an error data $D_6$, indicating the difference between the actual injection advance and the computed optimum injection advance, is produced. The error data $D_6$ is applied to a PI control circuit 65 to be converted into data adapted to carry out a proportion-integration control operation and the output data $D_7$ from the circuit 65 is applied to a change-over switch 66.

The output data $D_7$ is applied as a timer control signal to a pulse width modulator 67 through the switch 66 and a D/A converter 68. The pulse width modulator 67 produces a pulse signal as the driving signal $S_3$. The duty ratio of the signal $S_3$ varies in accordance with the level of the signal from the D/A converter 68 and the driving signal $S_3$ is applied to the solenoid valve 34 used for controlling the timer 27. The change of the actual injection advance caused by the operation of the timer 27 is fed back as a change in the actual injection advance data $D_4$ to the adder 64, and then, the timer 27 is controlled in such a way that actual injection advance is made coincident with the optimum injection advance.

In order to assure continued normal operation of the injection amount control section 51 even if the operation of the sensor 40 should be impaired for some reason so that the information concerning the engine speed cannot be received from the sensor 40, there is provided a first signal generating circuit 69 to which the timing signal $S_5$ from the sensor 44 is applied as information concerning the engine speed. The circuit 69 produces stand-by engine speed data $D_b$ on the basis of the timing signal $S_5$ to make up for the lack of the data $D_a$. The stand-by engine speed data $D_b$ is applied to the change-over switch 55, and one of the data $D_a$ and $D_b$ is selected by the operation of the change-over switch 55 to deliver it as the engine speed data $D_1$.

Figure 5:
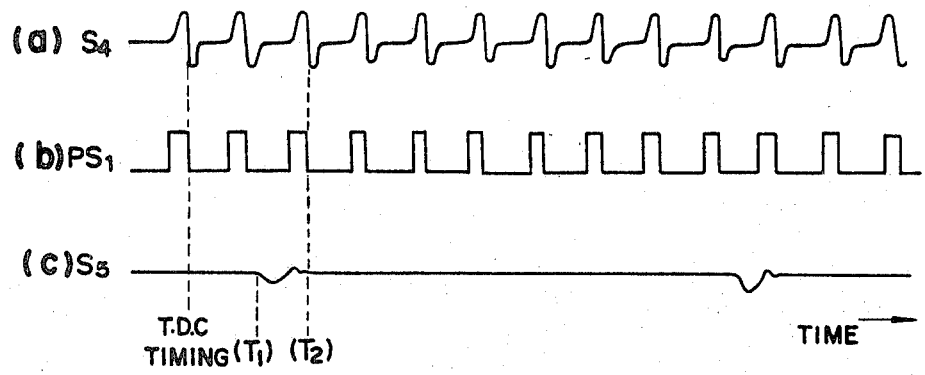

The computed engine speed data $D_a$ and the stand-by engine speed data $D_b$ will be described in conjunction with FIG. 5.

The computed engine speed data $D_a$ is computed in the speed computing circuit 54 on the basis of the signal $S_4$ and the waveform of the signal $S_4$ is shown in FIG. 5(a). As will be understood from FIG. 5(a), the signal $S_4$ is composed of a plurarity of pairs of positive and negative pulses, one pair being produced each time a cog approaches and then departs from the coil 43. The timing of the zero pulse level between the positive pulse and the negative pulse in each pair of pulses is the same as the top dead center timing. In the waveform shaping circuit 80, the signal $S_4$ is rectified and then is shaped in waveform to form a square wave pulse signal $PS_1$ as illustrated in FIG. 5(b). The speed computing circuit 54 computs the engine speed by measuring the period or the frequency of the pulse signal $PS_1$ and produces the measured result in digital form. On the other hand, in this embodiment, the timing signal $S_5$ is a signal having a period of just eight times as long as that of the signal $S_4$ as shown in FIG. 5(c). In the waveform of the signal $S_5$, each point at which the signal level begins to change to the negative direction designates the timing of the beginning of fuel injection. In the first signal generating circuit 69, the timing signal $S_5$ is also rectified and shaped in waveform in a similar way to the processing for signal $S_4$ and the engine speed is computed on the basis of the period or the frequency of the processed signal to produce the computed result in digital form as the data $D_b$.

As described in more detail hereinafter, the change-over switch 55 is switched over in such a way that the computed speed data $D_a$ is selected as engine speed data $D_1$ when the sensor 40 operates normally and the stand-by speed data $D_b$ is selected as the engine speed data $D_1$ when trouble occurs in the sensor 40.

When trouble occurs in the sensor 40, the supplying of the signal $S_4$ to the fuel injection timing control section 52 is stopped. As described above, since the actual injection advance is computed in the circuit 62 on the basis of the signal $S_4$ and $S_5$, the injection timing control section 52 is also rendered inoperative when signal $S_4$ cannot be received.

In order to assure continued operation of the injection timing control section 52 even when trouble occurs in the sensor 40 or sensor 44, there is provided a second signal generating circuit 70. The second signal generating circuit 70 is a circuit for generating stand-by control data $D_8$ on the basis of the injection amount data $Y_4$ and the data $D_8$ is used to control the pulse width modulator 67 so as to be able to obtain an injection advance which is approximately coincident with the optimum injection advance which would be obtained by the controlling operation by the data $D_7$ if the signal $S_4$ were available. The data $D_8$ is applied to the change-over switch 66. Since the data $D_8$ is selected by the change-over switch when the trouble occurs in the sensor 40, the stand-by control data $D_8$ is applied to the pulse width modulator 67 via the D/A converter 68 in place of the data $D_7$.

In order to switch over the switches 55, 56 and 66 in response to the occurrence of trouble in the sensor 40 or 44, there is provided a sensor check circuit 71 according to the present invention, to which the pulse signal $PS_1$ and another pulse signal $PS_2$ relating tp the signal $S_5$ are applied. The pulse signal $PS_2$ is an output signal from a waveform shaping circuit 72 which shapes the waveform of the signal $S_5$. The two input pulse signals are used for monitoring each other in the sensor check circuit 71, and the trouble in the sensor 40 or 44 is detected by the sensor check circuit 71. The levels of both output lines 73 and 74 become high at the same time when any trouble in the sensor 40 is detected by the circuit 71, so that the switches 55, 56 and 66 are switched over as shown by the dotted lines, and the level of only the output line 74 becomes high when any trouble in the sensor 44 is detected by the circuit 71, so that only switch 66 is switched over as shown by the dotted line.

In FIG. 6, there is shown a detailed circuit diagram of the sensor check circuit 71 having a binary counter 120 to which the pulse signal $PS_1$ is applied as a count pulse and the pulse signal $PS_2$ is applied as a preset pulse. The counter 120 is preset at each falling edge of the pulse signal $PS_2$ so that the content of the counter 120 becomes 8 at that time, while the counter 120 counts down each time the pulse signal $PS_1$ is applied to the counter 120. The count in the counter 120 is applied to a decoder 121 in the form of digital data $D_a$ and the level of an output signal $A_1$ becomes high only when the content of the data $D_a$ is equal to 8. The pulse signal $PS_1$ is also applied to a SET terminal S of an R-S flip-flop 122 and a RESET terminal R of an R-S flip-flop 123, and the pulse signal $PS_2$ is applied to a RESET terminal R of the R-S flip-flop 122 and a SET terminal S of the R-S flip-flop 123. The Q output terminal Q of the R-S flip-flop 122 is connected through an inverter 124 of a detecting circuit 125 to one input terminal of an AND circuit 126 one of the other input of which receives the pulse signal $PS_2$ and another the output signal $A_1$. The Q output terminal Q of the R-S flip-flop 123 is connected to one input terminal of an Ex-OR circuit 127 and the output signal $A_1$ is applied to another input terminal of the Ex-OR circuit 127. The output terminal of the AND circuit 126 is connected to a SET terminal of an R-S flip-flop 128 a Q output terminal Q of which is connected to an output terminal 129, and the output terminal of the Ex-OR circuit 127 is connected to a SET terminal of an R-S flip-flop 130 a Q output terminal Q of which is connected through an OR circuit 131 to an output terminal 132. Another input terminal of the OR circuit 131 is connected to the Q output terminal Q of the R-S flip-flop 128 to make the level of the output terminal 132 high when the Q output level of either the R-S flip-flop 128 or 130 becomes high. The output terminal 129 is connected to the switches 55 and 56 through the output line 73 and the output terminal 132 is connected to the switch 66 through the output line 74 (see FIG. 2).

The operation of the sensor check circuit 71 will now be described in conjunction with FIGS. 6 and 7(a) to 7(e). Since the engine 3 is a four cylinder/four cycle engine in this embodiment, as seen from FIGS. 7(a) and 7(b), a pulse of the pulse signal $PS_2$ is produced each time the eight pulses of the pulse signal $PS_1$ are generated. However, due to an injection advance, the timing of the generation of each pulse of the pulse signal $PS_2$ is never coincident with that of any pulse of the pulse signal $PS_1$. Since the R-S flip-flop 122 is a trailing edge trigger type flip-flop, the R-S flip-flop 122 is reset when the level of the pulse signal $PS_2$ is changed from high to low, so that the level of a Q output signal $F_1$ of the R-S flip-flop 122 becomes low. Furthermore, the R-S flip-flop 122 is set at the time when the pulse of the pulse signal $PS_1$, which is generated just after the pulse of the pulse signal $PS_2$, is changed in level from high to low, the level of the Q output signal $F_1$ then becoming high (FIG. 7(c)). The count of the counter 120 is set to 8 by the application of the pulse of the pulse signal $PS_2$, and the pulses of the pulse signal $PS_1$ will be input as counting down pulses to the counter 120. In this case, if the signal is correctly produced from the sensor 40, the count of the counter 120 becomes zero just before the application of the next pulse of the pulse signal $PS_2$. As a result, after the synchronized relationship between the pulse signals $PS_1$ and $PS_2$ is established by applying the pulse of the pulse signal $PS_2$ to the counter 120, the count of the counter 120 just before the counter 120 is preset by the pulse of the pulse signal $PS_2$, will be zero in the normal operation. By utilizing the above-mentioned relationship between the pulse signals $PS_1$ and $PS_2$, the detecting circuit 125 detects that no pulse signal $PS_1$ is produced between the time when any one pulse of the pulse signal $PS_2$ is produced and the time when the next pulse of the pulse signal $PS_2$ is produced.

The detecting circuit 125 is composed of the inverter 124 and the three input AND circuit 126, and is arranged so as to derive the pulse of the pulse signal $PS_2$ as a first detection signal $A_2$ at the time when the level of the pulse signal $PS_2$ changes from low to high only when the level of the Q output signal $F_1$ is low and that of the signal $A_1$ is high.

If, for example, any trouble occurs in the sensor 40 at time $t_{11}$ and the production of the pulse signal $PS_1$ stops, the count of the counter 120 is maintained at 6. At this time, the level of the Q output signal $F_1$ is high because the flip-flop 122 is set by the pulse $P_a$ of the pulse signal $PS_1$ which is generated at time $t_{12}$. As a result, since the level of the Q output signal $F_1$ is high and the count of the counter 120 is 6 at the time $t_{13}$, the pulse of the pulse signal $PS_2$ at time $t_{13}$ is not derived from the detecting circuit 125. That is, the level of the first detection signal $A_2$ is maintained at low level. Although the level of the Q output signal $F_1$ becomes low at time $t_{14}$, since the pulse signal $PS_1$ is not continuously produced after this, the level of the Q output signal $F_1$ at time $t_{15}$ is low.

On the other hand, although the content of the counter 120 is set to be 8 at time $t_{14}$, since the pulse signal $PS_1$ is not produced after time $t_{14}$ so that the counter 120 does not count down, the count of the counter 120 is still 8 at time $t_{15}$. Therefore, the pulse of the pulse signal $PS_2$ produced at time $t_{15}$ is derived as the first detection signal $A_2$ (FIG. 7(d)). The first detection signal $A_2$ is applied to the SET terminal S of the R-S flip-flop 128, and once the level of the first detection signal $A_2$ becomes high, it is latched at this level in the R-S flip-flop 128. Consequently, the level of the Q output signal $Q_1$ of the R-S flip-flop 128 is maintained at high level after time $t_{15}$ so that the level of the output line 73 becomes high.

As will be understood from the foregoing description, since the circuit 71 is arranged so as to discriminate whether or not trouble in the sensor 40 has happened on the basis of the fact that the pulse signal $PS_1$ is not produced at all in the time period between the timing of genration any one pulse of the pulse signal $PS_2$ and that of the next pulse of the pulse signal $PS_2$, even if the cessation of production of the pulse signal $PS_1$ is momentary due to any reason, such as poor electrical contact, the level of the output line 73 never becomes high. Consequently, extremely high reliability of operation can be expected, and moreover, less time is required for detecting the trouble.

The trouble detecting operation for the sensor 44 will now be described in conjunction with FIGS. 6 and 8(a) to 8(g).

The R-S flip-flop 123 is set at the time when the level of the pulse signal $PS_2$ changes from low to high and is reset at the time when the level of the pulse signal $PS_1$ changes from low to high. The resulting Q output signal $F_2$ from the R-S flip-flop 123 is applied to the Ex-OR circuit 127 to which the signal $A_1$ is also applied. Therefore, assuming that the pulse signals $PS_1$ and $PS_2$ are produced as illustrated in FIGS. 8(a) and 8(b), the count of the counter 120 is changed thus 8→7→6→ . . . →0→8→7 . . . when both pulse signals $PS_1$ and $PS_2$ are correctly produced in accordance with a predetermined timing (that is, in the case of $t<t_{16}$), so that the waveform of the signal $A_1$ is completely equal to that of the Q output signal $F_2$. Therefore, the level of a second detection signal $A_3$, which is an output signal from the Ex-OR circuit 127, is maintained at low level. However, when the trouble occurs in the sensor 44 at time $t_{16}$ so that the production of the pulse signal $PS_2$ ceases after this, the level of the signal $F_2$ is maintained at low, and on the other hand, the counter 120 is not preset even after the count of the counter 120 becomes zero at time $t_{17}$. As a result, after time $t_{18}$, the counter 120 is in an underflow condition. When the count of the counter 120 becomes 8 at time $t_{18}$ due to the counting down operation, the level of the output signal $A_1$ becomes high in response thereto. However, since the level of the Q output signal $F_2$ is still maintained at low level, the level of the second detection signal $A_3$ will be varied as illustrated in FIG. 8(f) in accordance with the level change of the output signal $A_1$.

As a result, the R-S flip-flop 130 is set at the time $t_{19}$, and the level of the Q output signal $Q_2$ is maintained at high level after the time $t_{19}$. The Q output signals $Q_1$ and $Q_2$ are applied to the input terminals of the OR circuit 131 so that the level of the output line 74 becomes high in response to the occurrence of the trouble in either sensor 40 or 44 or both sensors 40 and 44.

As described above it follows that a condition of the count of the counter 120 being eight and the level of the Q output signal $F_2$ being low shows the occurrence of trouble in the sensor 44, because the counter 120 is not preset so is therefore in the underflow condition and the level of the Q output signal $F_2$ is maintained at low when no pulse signal $PS_2$ is produced. Therefore, in this case, it becomes a condition for detecting trouble in the sensor 44 that the pulse signal $PS_2$ be not generated at all for the time duration from $t_{18}$ to $t_{19}$. Consequently, for example, since the count of the counter 120 becomes 1023 in the underflow condition when the counter is a 10-bit binary counter, the condition for detecting the trouble in the sensor 44 is that no pulse of the pulse signal $PS_2$ is produced until the count of the counter 120 is counted down from 1023 to 8. Consequently, similarly to the trouble detecting operation for the sensor 40, it is prevented that the level of the second detection signal $A_3$ becomes high, for example, when the generation of the pulse signal $PS_2$ is temporarily ceased due to poor electrical contact or the like. Thus, extremely high reliability of the detecting operation can be realized for detecting the trouble in the sensors by employing the sensor check circuit of the present invention.

In the foregoing, although the condition for detecting the trouble in the sensor 44 is that no pulse of the pulse signal $PS_2$ is produced until the count of the counter 120 is counted down from 1023 to 8 in underflow condition which is outside the predetermined counting range of the counter 120, the present invention is not limited to this embodiment. That is, as illustrated in FIG. 9, the sensor check circuit 71' may be arranged in such a way that, by providing another decoder 133 for detecting that the count of the counter 120 becomes a predetermined value K other than eight, the condition for detecting the trouble in the sensor 44 is that no pulse of the pulse signal $PS_2$ is produced until the count of the counter 120 is counted down from an underflow value to K. Therefore, it is possible to set the time required for detecting the trouble in the sensor 44 to a desired time in accordance with the value K.

Furthermore, although the preset value selected for the counter 120 is eight, the present invention is not limited to this preset value, and another preset value may be selected.

In addition, in FIG. 6, a reset pulse is applied to the RESET input terminals R of the R-S flip-flops 128 and 130 after the operation of the sensor 40 or 44 returns to normal condition, and the levels of the output lines 73 and/or 74 become low so that the operation of the control system shown in FIG. 2 reverts to normal.

We claim:

1. A method for detecting the occurrence of a trouble in a first sensor for producing first pulses of a repetitive time period related to a first condition to be detected and the occurrence of a trouble in a second sensor for producing second pulses indicative of a second condition to be detected at a ratio of one pulse to the production of N first pulses, said method comprising the steps of:

applying said second pulses as preset pulses to a counter to which said first pulses are supplied as counting pulses so as to maintain the count value of said counter to within a predetermined range;

monitoring the change of the value counted by said counter between periods starting with the time of occurrence of one of said second pulses and ending with the time of occurrence of the next second pulse thereby detecting the occurrence of trouble in said first sensor; and monitoring whether or not the value of the output from said counter reaches a predetermined count value outside of said predetermined counting range, whereby the occurrence of a trouble in said second sensor is detected.

2. A method as claimed in claim 1, wherein said step of monitoring the change includes a first step of generating a signal in response to the non-production of said first pulse after the occurrence of one of the second pulses, a second step of detecting the count of said counter at the time of the occurrence of the next second pulse following said one second pulse, and a third step of generating a first trouble detecting signal when the count detected in said second step is equal to a value determined in advance for said counter when said signal exists.

3. A method as claimed in claim 1 or 2 wherein said first sensor is a speed sensor for producing a pulse train of a repetitive time period which is varied in relation to changes in the speed of a diesel engine and said second sensor is a fuel injection timing sensor for producing pulses each of which indicates the actual timing of a fuel injection.

4. An apparatus for detecting the occurrence of a trouble in a first sensor for producing first pulses of a repetitive time period related to a first condition to be detected or the occurrence of trouble in a second sensor for producing second pulses indicative of a second condition to be detected at a rate of one pulse to the production of N first pulses, said apparatus comprising:

- a first circuit for generating a first signal indicating whether or not said first pulse is generated after the occurrence of said second pulse;
- a second circuit for generating a second signal indicating whether or not said second pulse is generated after the occurrence of said first pulse;
- a counting means to which said first pulses are applied as counting pulses, said counting means being preset to a predetermined preset value each time the second pulse is input to said counting means; and
- a discriminating means for discriminating a trouble in said first or the second sensor on the basis of the count of said counting means, the state of said first signal and the state of said second signal.

5. An apparatus as claimed in claim 4 wherein said discriminating means comprises a circuit for producing a third signal indicating that the output data from said counting means is equal to a first predetermined count value, a first detector for detecting the trouble in said first sensor on the basis of the states of said first signal and said third signal at the time of the occurrence of the next second pulse following said second pulse, and a second detector for detecting the trouble in said second sensor on the basis of the states of said second and said third signals.

6. An apparatus as claimed in claim 5 wherein said counting means operates as a count-down counter.

7. An apparatus as claimed in claim 5 wherein said producing circuit produces the third signal when said count value is equal to said preset value.

8. An apparatus as claimed in claim 5 wherein said apparatus further comprises a circuit for producing a forth signal indicating that the output data from said counting means is equal to a second predetermined count value, and said second detector operates on the basis of the states of said second and said forth signals.

9. An apparatus as claimed in claim 4 wherein said first sensor is a speed sensor for producing a pulse train of a repetitive time period which is varied in relation to changes in the speed of a diesel engine and said second sensor is a fuel injection timing sensor for producing pulses each of which indicates the actual timing of a fuel injection.

* * * * *